United States Patent [19]
Nicholson et al.

[11] Patent Number: 6,084,002
[45] Date of Patent: Jul. 4, 2000

[54] FLAME RETARDANT SILICONE FOAMS

[75] Inventors: William Rosser Nicholson, Midland; Lawrence Joseph Rapson, Bay City; Kiersten Lynn Shephard, Midland, all of Mich.

[73] Assignee: Dow Corning Corporation, Midland, Mich.

[21] Appl. No.: 09/241,942

[22] Filed: Feb. 2, 1999

[51] Int. Cl.⁷ ............................................. C08J 9/00
[52] U.S. Cl. .......................... 521/91; 521/92; 521/154; 521/907
[58] Field of Search ........................ 521/91, 92, 154, 521/907

[56] References Cited

U.S. PATENT DOCUMENTS

| | | | |
|---|---|---|---|
| 3,419,593 | 12/1968 | Willing | 260/448.2 |
| 3,425,967 | 2/1969 | Modic | 260/2.5 |
| 3,923,705 | 12/1975 | Smith | 260/2.5 |
| 4,026,835 | 5/1977 | Lee et al. | 260/2.5 |
| 4,026,842 | 5/1977 | Lee et al. | 260/2.5 |
| 4,189,545 | 2/1980 | Modic | 521/131 |
| 4,433,069 | 2/1984 | Harper | 521/99 |
| 4,590,222 | 5/1986 | Bauman | 521/88 |
| 4,613,630 | 9/1986 | Bauman et al. | 521/134 |
| 4,631,299 | 12/1986 | Laisney et al. | 521/77 |
| 4,871,781 | 10/1989 | Weise | 521/88 |
| 5,358,975 | 10/1994 | Anderson | 521/77 |
| 5,744,508 | 4/1998 | Yaginuma et al. | 521/99 |

*Primary Examiner*—Morton Foelak
*Attorney, Agent, or Firm*—Jennifer S. Warren

[57] ABSTRACT

A cured silicone foam exhibiting high flame resistance and forming hard chars on burning, contains from about 1 to 60 percent by weight of wollastonite mineral, based on the weight of the composition. The silicone foam can be formed from any of the curable polyorganosiloxane foam-forming compositions known in the art. Preferred are those polyorganosiloxane foams cured using a platinum group metal catalyst. In a preferred composition the silicone foam is formed by curing a composition comprising a liquid polyorganosiloxane containing an average of at least two alkenyl radicals per molecule, an organohydrogensiloxane containing at least three silicon-bonded hydrogen atoms per molecule, a hydroxyl-containing compound, wollastonite, and a platinum catalyst.

26 Claims, No Drawings

FLAME RETARDANT SILICONE FOAMS

FIELD OF THE INVENTION

This invention relates to silicone foams having good fire resistance and good physical properties. In particular, this invention relates to silicone foams containing wollastonite filler.

BACKGROUND OF THE INVENTION

Various methods for preparing flame retardant polyorganosiloxane foams are described in the prior art. Modic in U.S. Pat. No. 3,425,967 teaches the use of mixtures containing asbestos and fibrous potassium titanate as flame retarding additives for polyorganosiloxane foams. Lee et. al in U.S. Pat. No. 4,026,842 and Smith in U.S. Pat. No. 3,923,705 teach use of platinum or a platinum compound to improve flame retardancy of polyorganosiloxane foams prepared by reacting organohydrogen siloxanes and siloxanes containing silicon-bonded hydroxyl groups. Smith teaches that flame retardancy can be further improved by carbon black. Harper et al. in U.S. Pat. No. 4,433,069 teach fire resistant polysiloxane foams having a combination of at least 0.1% each of a nonmetallic fibrous heat resistant material, at least one finely divided nonmetallic cellular heat resistant material, and at least 5 ppm platinum. The fibrous heat resistant materials include naturally occurring materials, such as asbestos, and man-made fibers and whiskers formed from glass, carbon, alumina, inorganic silicates such as aluminum silicate and mixtures of aluminum silicate with alkali metal and/or alkaline earth metal silicates. Preferred fibrous heat resistant materials are glass and carbon.

In U.S. Pat. No. 4,590,222, Bauman teaches a silicone foam composition containing a polydiorganosiloxane, a resinous copolymer, a platinum catalyst, an organohydrogensiloxane, a hydroxyl-endblocked polydiorganosiloxane, a filler and an organic alcohol. In U.S. Pat. No. 4,871,781 Weise teaches a foamable composition comprising a polyorganosiloxane, a polyorganohydrogensiloxane, a platinum catalyst, and a saturated polyhydric alcohol. In U.S. Pat. No. 5,358,975, Anderson teaches a foamable composition comprising a polyorganosiloxane, an organohydrogensiloxane, a platinum catalyst, an α,w-diol, and a resinous copolymer.

SUMMARY OF THE INVENTION

The present invention provides a cured silicone foam exhibiting uniquely high flame resistance and forming hard chars on burning, containing from about 1 to 60 percent by weight of wollastonite mineral, based on the weight of the composition. The silicone foam can be formed from any of the curable polyorganosiloxane foam-forming compositions known in the art. Preferred are those polyorganosiloxane foams cured using a platinum group metal catalyst.

In a preferred composition the silicone foam is formed by curing a composition comprising a liquid polyorganosiloxane containing an average of at least two alkenyl radicals per molecule, an organohydrogensiloxane containing at least three silicon-bonded hydrogen atoms per molecule, a hydroxyl-containing compound, wollastonite, and a platinum catalyst.

DETAILED DESCRIPTION OF THE INVENTION

This invention provides a cured, flame retardant silicone foam comprising a matrix of cured, cellular polyorganosiloxane containing a uniformly dispersed additive comprising at from 1 to 60 weight percent wollastonite. The foams have unexpectedly good fire resistance and form hard char structures on burning. The inventors have also made the discovery that the use of wollastonite as replacement for other nonreinforcing fillers in polyorganosiloxanefoams gives an unexpected advantage in the ability to adjust the compression deflection property of the foam without a large effect on other properties such as density, tensile, elongation, and tear.

Wollastonite, also known as calcium metasilicate, is a naturally occurring mineral. The wollastonite used in this invention is a mined form, having an acicular morphology, that is a needle-like shape. Typically, this mineral has a number average particle size of from about 2 to 30 $\mu$m and an aspectratio (length:diameter) of 3:1 to about 30:1. It is preferred that the wollastonite have a number average particle size from about 5 to 15 $\mu$m, and an aspect ratio from about 15:1 to about 30:1. The wollastonite used in this invention has a low BET surface area, typically less than 25 $m^2/g$, and preferably less than 5 $m^2/g$. Preferred wollastonite grades are selected from materials supplied by NYCO® Minerals, Inc., Willsboro N.Y. Compositions using calcium silicates of other shapes and morphologies than wollastonite may not exhibit the char formation or low heat release rates of those of the present invention. For example, a composition made with synthetic calcium silicate, which typically has a spherical shape will not have the desired fire performance.

Compositions with less than about 1 weight percent wollastonite do not exhibit the char formation and low heat release rate of the present invention. The upper limit of wollastonite that is useful will depend on the properties desired in the uncured and cured composition, and the ability to have the uncured material form and maintain a foam. Generally, wollastonite present at greater than about 60 percent by weight results in uncured compositions that are too stiff, and therefore difficult to process, and may not blow into uniform foams.

A preferred flame retardant silicone foam-forming composition comprises:
(A) a liquid polyorganosiloxane containing an average of at least two alkenyl radicals per molecule;
(B) an organohydrogensiloxane containing at least three silicon-bonded hydrogen atoms per molecule wherein there is no more than one of said hydrogen atoms per silicon atom;
(C) a hydroxyl containing compound;
(D) a platinum metal group catalyst; and
(E) wollastonite.

Even more preferred are when the compositions further comprise
F) a resinous polyorganosiloxane.

Component (A) is a liquid polyorganosiloxane. Suitable polyorganosiloxanes contain at least two alkenyl radicals per molecule and exhibit a viscosity at 25° C. of 10 to 1,000,000 mPa.s, and preferably 100 to 250,000 mPa.s. Preferred alkenyl radicals include vinyl, allyl and hexenyl. Vinyl radicals are most preferred. At least 90 percent of the repeating units in this polyorganosiloxane are diorganosiloxane units represented by the general formula $R^1R^2SiO$ where $R^1$ and $R^2$ are independently selected from monovalent unsubstituted and substituted hydrocarbon radicals that typically contain from 1 to 10 carbon atoms. The alkenyl radicals that characterize the curable polyorganosiloxane are preferably located at the terminal siloxane unit of the molecule, however one or more can be bonded to non-terminal siloxane units.

In preferred polyorganosiloxanes at least one of the hydrocarbon radicals bonded to each silicon atom is a methyl radical and any remaining hydrocarbon radicals are phenyl, 3,3,3-trifluoropropyl, alkyl or alkenyl. In more preferred polyorganosiloxanes at least 80% of the total number of silicon-bonded hydrocarbon radicals are methyl and the remaining hydrocarbon radicals are alkyl or alkenyl. The polyorganosiloxane may comprise two or more organosiloxane polymers having for example different viscosities, organic substituents or alkenyl content.

Component (B) is an organohydrogensiloxane and functions as a curing agent in the foam-forming composition of the present invention. The silicon-bonded hydrogen atoms in the organohydrogensiloxane react with the alkenyl radicals of the polyorganosiloxane of Component (A) to cure the foam forming composition of the present invention. The silicon-bonded hydrogen atoms in the organohydrogensiloxane are also used to generate hydrogen gas for foaming the composition of the present invention. Organohydrogensiloxanes that may be used as Component B contain an average of at least three silicon-bonded hydrogen atoms per molecule. The remaining valences on the silicon atoms are satisfied with organic groups selected from alkyl having 1 to 6 carbon atoms and phenyl groups. Preferred alkyl groups include methyl, ethyl and hexyl. The most preferred organic groups are methyl groups.

The organohydrogensiloxane of Component (B) can have a linear, cyclic, or branched structure, and can be a homopolymer, a copolymer, mixtures of two or more different homopolymers, mixtures of two or more different copolymers or mixtures of these types of polymers. Polymers that are suitable for use as Component (B) include but are not limited to polymethylhydrogensiloxane, trimethylsiloxy-terminated polymethylhydrogensiloxane, copolymers of dimethylsiloxane, methylhydrogensiloxane and trimethylsiloxane units and copolymers of dimethylsiloxane, methylhydrogensiloxane and dimethylhydrogensiloxane units. Preferred organohydrogensiloxanes have a linear structure, exhibit a viscosity of 1 to 10,000 mPa.s at 25° C., and comprise dialkylsiloxane and alkylhydrogensiloxane units with trialkylsiloxy terminal units, where the alkyl radicals contain from 1 to 4 carbon atoms and are most preferably methyl.

The portion of Component (B) used should be sufficient to provide the desired degree of crosslinking during cure and to produce the required amount of hydrogen gas for foaming the mixture. Generally, the proportion of Component (B) will be within the range of from about 2 to about 80 parts, and preferably 5 to 40 parts by weight per 100 parts by weight of Component (A).

Component (C) is a hydroxyl containing compound selected from the group consisting of polyols, monofunctional alcohols, silanol group-containing organosilanes, silanol group-containing organosiloxanes, and water. Component (C) may also comprise mixtures of such compounds. The hydroxyl groups on Component (C) react with some of the silicon-bonded hydrogen of Component (B) in the preferred composition to produce hydrogen, which creates the cells in the foam. Component (C) may be referred to in the art as a blowing agent.

When Component (C) comprises a polyol, it is an organic alcohol having from 3 to 12 carbon atoms and containing an average of at least two hydroxyl groups per molecule. The carbon chain which makes up the backbone of the polyol may be straight-chained or branched, or may have an aromatic ring to which a hydroxyl group is not directly bonded. Usable polyols include saturated polyhydric alcohols having at least two hydroxy groups per molecule. Saturated polyhydric alcohols are taught, for example by Weise in U.S. Pat. No. 4,871,781, which is incorporated for reference for its teaching regarding saturated polyhydric alcohols as blowing agent. Examples of aliphatic polyhydric alcohols are diols, such as 1,2-ethanediol, 2,3-propanediol, 1,3-propanediol, 1,4-butanediol, 1,5 pentanediol, and 1,6-hexane diol; 1,2,3-propanetriol; 2,2-bis-hydroxymethyl-1-butanol; tetritols, such as erythritol and pentaerythritol (2,2-bis-hydroxymethyl-1,3-propane diol); pentitols, such as arabitol, xylitol, and methylpentitol; hexitols, such as mannitol and sorbitol; and cycloaliphatic polyhydric alcohols such as cyclohexanediols, cyclohexane tirols, and inositol.

In the present composition, the preferred polyol is a diol. Preferred diols are 1,2 ethanediol, 1,4-butanediol, 1,5-pentanediol and 1,7-heptanediol. Sufficient polyol should be used to obtain the necessary amount of hydrogen for the foaming process and/or the desired degree of release in the post cured foams. Generally about 0.05 to 8 parts by weight of Component (C) should be used per 100 parts of the combined weight of Components (A) and (B). The preferred amount of Component (C) is 0.2 to 5 parts by weight per 100 parts of the combined weight of Components (A) and (B).

When Component (C) comprises a monofunctional alcohol, it is a organic alcohol containing 1 to 12 carbon atoms and one hydroxyl group per molecule. The carbon chain which makes up the backbone of the organic alcohol may be straight chained, branched, or may have an aromatic ring to which a hydroxyl group is not directly bonded. This optional monofunctional alcohol differs from the polyol in that the monofunctional alcohol can not contain an average of more than one hydroxyl group per molecule. The amount of optional monofunctional alcohol that is needed to reduce the density of the foam of the present invention varies depending upon the composition of the foam forming composition and the monofunctional alcohol used. Examples of monofunctional alcohols include methanol, ethanol, n-propanol, isopropanol, n-butanol, 2-butanol, tert-butanol, n-octanol, and benzyl alcohol. The amount of monofunctional alcohol that is necessary is generally from about 0.1 to 10 parts of monofunctional alcohol per 100 parts of the combined weight of Components (A) and (B). The preferred monofunctional alcohol is benzyl alcohol. It is especially preferred that Component (C) be a mixture of a polyol as described above and a monofunctional alcohol.

When Component (C) is a silanol group-containing organosilane, it includes, for example, compounds represented by the general formulas (1) and (2):

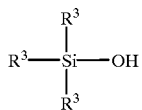
(1)

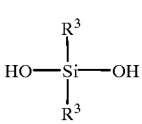
(2)

where $R^3$ is a substituted or unsubstituted monovalent hydrocarbon containing no aliphatic unsaturated bonds. $R^3$ may include alkyl groups having 1 to 6 carbon atoms such as a methyl group, an ethyl group and a propyl group; cycloalkyl groups having 6 to 10 carbon atoms such as a cyclohexyl group; aryl groups having 6 to 10 carbon atoms such as a phenyl group and a tolyl group; aralkyl groups having 7 to 12 carbon atoms such as a benzyl group, a 2-phenylethyl group and a 1-phenylpropyl group; and any of these groups where at least one hydrogen atom has been substituted with a halogen atom (e.g. a 3,3,3-trifluoropropyl group). Preferably, $R^3$ is methyl. The groups represented by $R^3$s may be all the same or may be different from one another. Such organosilanes are exemplified by the following compounds:

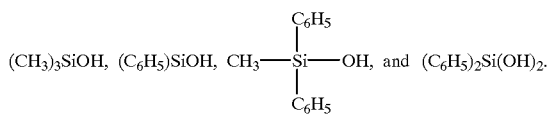

When Component (C) is a silanol group-containing organosiloxane, it includes, for example, compounds represented by the general formula (3)

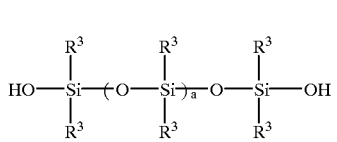
(3)

$R^3$ is as defined previously, and a is an integer that from 0 to about 50, preferably about 1 to about 50, and more preferably about 3 to about 20.

When Component (C) comprises a silanol group-containing organosilane or a silanol group-containing organosiloxane, it is added in an amount from about 0.1 to 20 parts by weight, and preferably 0.2 to 10 parts by weight, based on 100 parts by weight of Component (A). The use of silanol group-containing organosilane and silanol group-containing organosiloxanes as blowing agents is described, for example, by Yaginuma et al. in U.S. Pat. No. 5,744,508, which is incorporated by reference for what it teaches regarding the use of such blowing agents.

When Component (C) is water, it is added in an amount from about 100 parts per million parts to 1.5 parts by weight of water based on 100 parts component (A). Preferably from 500 to 15,000 parts per million of the total composition will be water. The use of water as a blowing agent for silicone foams is taught, for example, by Modic in U.S. Pat. No. 4,289,545, which is hereby incorporated for reference for what it teaches regarding the use of water as a blowing agent. The water is added such that there is 0.2:1 to 50:1 moles of silicon-bonded hydrogen in Component (B) per mole of water. The preferred range of silicon-bonded hydrogen to water is from 1:1 to 5:1.

Component (D) is a platinum group metal catalyst such as rhodium, ruthenium, palladium, osmium, irridium or platinum-containing catalysts. Useful rhodium catalysts are described by Lee et al. in U.S. Pat. No. 4,026,835, which is hereby incorporated for its teaching on rhodium catalysts for silicone foams. Platinum-based catalysts are particularly preferred and may take any of the known forms that are effective in promoting the reaction of SiH groups with silicon-bonded alkenyl groups. Such catalysts are also efficient in promoting the reaction between SiH groups and ≡COH groups in organic alcohols to provide hydrogen for the foaming process. Suitable forms of platinum include but are not limited to chloroplatinic acid, platinum compounds and complexes of platinum compounds with unsaturated organic compounds or with siloxanes having silicon-bonded groups containing ethylenically unsaturated groups. Additional examples of suitable platinum catalysts include complexes of platinous halides or chloroplatinic acid with divinyldisiloxane and complexes formed by the reaction of chloroplatinic acid, divinyltetramethyldisiloxane and tetramethyldisiloxane. Suitable platinum catalysts are described by Willing in U.S. Pat. No. 3,419,593 which is incorporated herein by reference for what it teaches about the preparation of such catalysts.

The amount of platinum catalyst is generally the amount that provides from 5 to 250 parts by weight of platinum metal per million parts of the combined weights of Components (A) and (B). Amounts of platinum less than 5 parts per million by weight are insufficient for foam to form, while amounts greater than 200 parts per million by weight are not economical.

Component (E) is wollastonite, as described above.

Optional Component (F) is a resinous polyorganosiloxane. Suitable resinous polyorganosiloxane resins for use in silicone foams are taught by Laisney, et al. in U.S. Pat. No. 4,631,299, by Anderson in U.S. Pat. No. 5,358,97, and by Bauman et al. in U.S. Pat. No. 4,613,630, which are incorporated for reference here for their teaching on use of polyorganosiloxane resins in silicone foams. Preferably, Component (F) in the foam-forming composition of the present invention is selected from resinous organosiloxane copolymers comprising triorganosiloxy and $SiO_{4/2}$ units, referred to in the art as an MQ resins. The triorganosiloxy units in this type of copolymer can be represented by the formula $R^4_3SiO_{1/2}$, where $R^4$ represents a monovalent unsubstituted or substituted hydrocarbon radical. $R^4$ may include alkyl groups having 1 to 6 carbon atoms such as a methyl group, an ethyl group and a propyl group; alkenyl groups such as vinyl and hexenyl; aryl groups having 6 to 10 carbon atoms such as a phenyl group and a tolyl group; aralkyl groups having 7 to 12 carbon atoms such as a benzyl group; and any of these groups where at least one hydrogen atom has been substituted with a halogen atom (e.g. a 3,3,3-trifluoropropyl group. The groups represented by $R^4$ may be all the same or may be different from one another. In preferred copolymers, the hydrocarbon radicals represented by $R^4$ are lower alkyl radicals. The most preferred $R^4$ is a methyl or vinyl radical. The molar ratio of triorganosiloxy units to $SiO_{4/2}$ units in the copolymer is typically from 0.4 to 1.6, inclusive. Preferably, at least a portion of the silicon atoms in the copolymer alkenyl radicals, such as vinyl, as substituents. The resin may have from 1 to 6 weight percent hydroxyl radicals. Component (F) may constitute up to 75 weight percent preferably up to 50 weight percent, and most preferably up to 30 weight percent of the combined weight of the curable alkenyl-substituted polyorganosiloxane and the copolymer.

In addition to the Components (A), (B), (C), (D), (E), and (F), the foam forming composition of the present invention can contain various components to modify the properties of the curable composition and/or the cured foam. These optional Components include, but are not limited to, finely divided reinforcing and non-reinforcing mineral fillers in addition to the wollastonite, such as silica, quartz, diatomaceous earth, and calcium carbonate; metal oxides such as alumina, hydrated alumina, ferric oxide and titanium dioxide; pigments such as carbon black and zinc oxide; organic pigments and dyes; anti-oxidants, heat stabilizers, thixotropic agents, foam stabilizers, ultraviolet stabilizers, flame retarding agents and catalyst inhibitors such as cyclic methylvinylsiloxanes to increase the working time of the foam forming compositions. When the optional component is a reinforcing or non-reinforcing filler the average particle size of the filler may be such that the diameter ranges from 0.1 to 20 μm, preferably from 0.2 to 5 μm, most preferably 0.4 to 2.5 μm. Non-reinforcing fillers are preferred over reinforcing fillers because reinforcing fillers, such as fumed silica and precipitated silica, when incorporated into the composition in any concentration may increase the viscosity of the composition, making it difficult to handle. However, fumed silica and precipitated silica have the advantage of increasing tensile strength and tear strength of the foam.

In addition to the preferred flame retardant silicone foam-forming composition, other foam-forming compositions embody the present invention. For example, a second embodiment of the present invention is a silicone foam-forming composition comprising:

($A^1$) a hydroxylated polyorganosiloxane containing an average of from about 1 to 2.5 silicon-bonded hydroxyl radicals per molecule;

(B) an organohydrogensiloxane containing at least three silicon-bonded hydrogen atoms per molecule wherein there is no more than one of said hydrogen atoms per silicon atom;

(D) a platinum catalyst; and (E) wollastonite.

Component ($A^1$) is a hydroxylated organosiloxane having from about 1 to 2.5 silicone-bonded hydroxyl radicals per molecule. The organic radicals can be any of those monovalent radicals described above for Component (A). Component ($A^1$) can be a homopolymer, copolymer, or mixtures thereof. Examples of hydroxylated polyorganosiloxane include hydroxyl-endblocked polydimethylsiloxane, hydroxyl-endblocked polydiorganosiloxane having siloxane units of dimethylsiloxane and phenylmethylsiloxane, hydroxyl-endblocked polymethyl-3,3,3-trifluoropropylsiloxane, and hydroxyl endblocked polyorganosiloxane having siloxane units of monomethylsiloxane, dimethylsiloxane, and diphenylsiloxane. Component ($A^1$) also includes mixtures of hydroxylated organosiloxane polymers and hydroxylated organosilanes, such as a mixture of hydroxyl endblocked polydimethylsiloxane and diphenylmethylsilanol. The molecular weight of Component ($A^1$) is not significant, except that the total composition of this embodiment has a viscosity of less than about 500,000 mPa.s at 25° C. Preferably the polymer has a viscosity at 25° C. of 10 to 500,000 mPa.s, and more preferably 100 to 250,000 mPa.s.

Components (B) has the same structure as Component (B) of the first, preferred embodiment. Components ($A^1$) and (B) are present in this second embodiment in sufficient amounts to provide a molar ratio of silicon-bonded hydrogen atoms to silicon-bonded hydroxyl radicals of from 2.5 to 40. Ratios of less than 2.5 and greater than 40 provide foams, but these foams are either too friable or weak to be useful. Within the range of molar ratio of 2.5 to 40, the foam density will decrease as the ratio increase, where other factors are constant.

Component (D) is as described above and is present in this second embodiment in amounts to provide from 5 to 250 parts by weight platinum metal, per million parts by weight of the total composition.

Component (E) is wollastonite, as described above.

The method of this invention is carried out by preparing a foam-forming composition by mixing all components together to homogeneity. As long as the components are mixed to homogeneity, the method of mixing is not critical. Mixing can be done, for example, manually, using static mixing equipment or dynamic mixing equipment.

The foam-forming composition will begin to foam at normal ambient temperatures shortly after mixing has been commenced. If desired, the onset of foaming and curing can be delayed by including an inhibitor in the foam forming composition. Suitable inhibitors are those known in the art, such as methylvinylsiloxanes or acetylenic alcohols. Cure of the foamed composition will occur at normal ambient temperatures. When compositions are being used as gap filling in construction applications, such ambient temperature cure may be preferred. However, in preferred embodiment of the present invention, the curing step is completed at elevated temperatures. In the preferred embodiment, foams are preformed as sheeting for fabrication for applications such as gaskets. Temperatures of at least 40° C. are preferred. The cured foam is post cured to improve the physical properties of the final foam. For example, in pre-formed gaskets, post curing will improve the resistance to compression set.

The following examples described preferred embodiments of the foam forming composition of the present invention and should not be interpreted as limiting the scope of the invention defined in the accompanying claims. All parts and percentages in the examples are by weight and viscosities were measured at 25° C.

EXAMPLES

The following examples make use of the preferred embodiment of the present invention for illustrative purposes only, and should not be construed as limiting the present invention which is properly set out in the claims.

Test Procedures

In the following examples, foam-forming compositions were prepared for testing by hand mixing base and curing agent at a 10:1 ratio for sixty seconds. The foam-forming composition was then poured on to sheet polyester and sandwiched between another sheet of polyester. The desired thickness was achieved by pulling the foam-forming composition through a Laboratory Drawdown Coater (Chemsultants International Network, Mentor, Ohio). The sheeted foam was then cured for four minutes at 54° C., then four minutes at 100° C. It was then post-cured for ten minutes at 150° C. and allowed to return to room temperature. Tensile, tear and elongation were tested according to ASTM D 412. Sheet density was determined by cutting a 7.6 cm×7.6 cm square from near the center of the sheeted foam. The thickness of the foam was then measured five (5) time across the sheet. Measurements were taken at the four corners and the center of the sample to 0.001 mm. The weight was measured to 0.01 g. Density was determined by dividing the weight in grams by the volume in cubic centimeters.

Heat release rates were determined by a cone calorimeter under ASTM E1354. In the cone calorimeter, a conical electrical burner was positioned above the sample to emit a defined heat flux towards the sample. A spark igniter situated above the sample's surface was used to ignite the volatile gasses being distilled from the sample. When the volatiles ignited, the time until ignition was recorded and the spark igniter is turned off. The oxygen concentration as a function of time was measured to determine the heat release rate.

The dimensions of the samples were 10.2 cm×10.2 cm×0.635 cm. The samples were tested in a horizontal configuration with a metal frame, which is described in ASTM E1254, to prohibit the samples from curling upward. The heat samples were tested at a heat flux of 50 kW/m$^2$. Heat release rate, HRR, which determines the size of a fire is calculated from oxygen consumption data and differentiates how much heat is evolved from a sample per unit time.

Example 1

Foam-forming silicone compositions were prepared as follows. All parts are parts by weight.

66.4 parts dimethylvinylsiloxy terminated dimethyl siloxane having a viscosity of about 44,000 mPa.s at 25° C. and 0.23 wt. % vinyl; 21.1 parts filler as described in Table 1-1; 0.4 parts benzyl alcohol; 0.5 parts 1,4 butanediol; 0.4 platinum complexes; and 5.9 parts trimethylsiloxy terminated dimethyl, methylhydrogensiloxane, with an average degree of polymerization of 65.

Table 1 shows the amount of filler and cone calorimeter test results. Table 2 shows the viscosity of the foam forming composition and the mechanical properties of the cured foams. The char structure of the material drastically changed from a cracked friable sample seen in 1-1 and 1-2 to a hard ceramified char which contained only one crack in it. Sample 1-3, the wollastonite-modified foam also demonstrated heat shielding evidenced by the lack of a black char on the backside of the sample which was seen in 1-1 and 1-2. Overall, the improvement of the fire performance with Sample 1-3 over Samples 1-1 and 1-2 was surprisingly superior in light of the small amount of wollastonite used.

TABLE 1

Foam Filler Contents and Fire Properties.

| Sample # | Alumina trihydrate wt % | Diatomaceous earth wt % | Wollastonite wt % | Peak Heat Release Rate kW/m$^2$ | Wt Loss After Burning, % | Char Structure |
|---|---|---|---|---|---|---|
| 1-1 | 7.4 | 13.7 | 0 | 127 | 19 | cracked in many pieces, friable. Black char seen on back of sample |
| 1-2 | 0 | 21.1 | 0 | 123 | 19 | cracked in many pieces, friable. Black char seen on back of sample |
| 1-3 | 0 | 18.8 | 2.3 | 115 | 15 | foam has shape retention, hard ceramified |

TABLE 2

Mechanical properties of foams.

| Sample Number | Viscosity mPa · s | Sheet Density kg/m³ | Tensile kPa | Elongation % | Tear C N | 25% Compression Deflection | Compression Set 50%, 22 hr. @ 100° C. |
|---|---|---|---|---|---|---|---|
| 1-1 | 274,400 | 200.2 | 154 | 80.1 | — | 2.7 | 2.63 |
| 1-2 | 218,400 | 243.5 | 194 | 81.2 | 19 | 4.8 | 3.3 |
| 1-3 | 198,000 | 251.5 | 219 | 82.5 | 20 | 5.5 | 3.3 |

Example 2

Samples were made with the following formulation to compare wollastonite filled foam with alumina trihydrate foam. All parts are parts by weight.

47.3 parts dimethylvinylsiloxy terminated dimethyl siloxane, with viscosity of 55,000 mPa.s; 7.3 parts of either alumina trihydrate or wollastonite; 3.7 parts benzyl alcohol; 0.3 parts platinum complexes; 18 parts dimethylvinylated and trimethylated silica; 3.2 parts trimethylsiloxy terminated methylhydrogensiloxane, with an average degree of polymerization of 8; 13.8 parts diatomaceous earth; and 2.4 parts trimethylsiloxy terminated dimethyl, methylhydrogensiloxane, with an average degree of polymerization of 65.

Sample 2-1, with only alumina trihydrate, had significantly poorer fire performance than Sample 2-2 which had wollastonite. The char structure of Sample 2-1 was cracked and friable. The char structure of Sample 2-2 was a hard, ceramified char with few cracks. Sample 2-1 had a black char on the side not exposed to heat. Sample 2-2 provided heat shielding, with the result that the black char was not seen on the backside of the sample.

TABLE 3

Foam Filler Contents and Fire Properties.

| Sample # | Alumina trihydrate wt % | Wollastonite wt % | Peak Heat Release Rate kW/m² | Wt Loss After Burning, % | Char Structure |
|---|---|---|---|---|---|
| 2-1 | 13.8 | 0 | 142 | 18 | cracked in many pieces |
| 2-2 | 0 | 13.8 | 103 | 10 | cracked in 3 pieces |

We claim:

1. A cured silicone foam comprising 1 to 60 weight percent wollastonite mineral.

2. The cured silicone foam of claim 1 where the wollastonite has a number average particle size of from about 2 to 30 μm and an aspect ratio (length-to-diameter) of from about 3:1 to 30:1.

3. The cured silicone foam of claim 2 where the wollastonite has a number average particle size of from about 5 to 15 μm.

4. The cured silicone foam of claim 2 where the wollastonite has an aspect ratio of from about 15:1 to 30:1.

5. A curable silicone foam composition comprising:

A) a liquid polyorganosiloxane containing an average of at least two alkenyl radicals per molecule;

B) an organohydrogensiloxane containing at least three silicon-bonded hydrogen atoms per molecule wherein there is no more than one of said hydrogen atoms per silicon atom;

C) a hydroxyl containing compound;

D) a platinum group metal catalyst; and

E) wollastonite.

6. The composition of claim 2 further comprising

G) a resinous polyorganosiloxane.

7. The composition of claim 5 where Component (A) has a viscosity at 25° C. of 10 to 1,000,000 mPa.s.

8. The composition of claim 5 where Component (B) is selected from polymethylhydrogensiloxane, trimethylsiloxy-terminated polymethylhydrogensiloxane, copolymers of dimethylsiloxane, methylhydrogensiloxane and trimethylsiloxane units and copolymers of dimethylsiloxane, methylhydrogensiloxane and dimethylhydrogensiloxane units.

9. The composition of claim 5 where the hydroxyl containing compound comprises a polyol having from 3 to 12 carbon atoms and containing an average of at least two hydroxyl groups per molecule.

10. The composition of claim 9 where the polyol is a diol selected from the group consisting of 1,2 ethanediol, 1,4-butanediol, 1,5-pentanediol and 1,7-heptanediol.

11. The composition of claim 5 where the hydroxyl containing compound comprises a monofunctional alcohol comprising 1 to 12 carbon atoms and one hydroxyl group per molecule.

12. The composition of claim 5 where the hydroxyl containing compound comprises a silanol group-containing silane.

13. The composition of claim 12 where the silanol group-containing silane is selected from compounds represented by the general formulas (1) and (2):

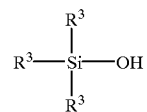

(1)

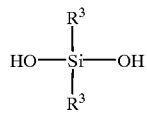

(2)

where $R^3$ is a substituted or unsubstituted monovalent hydrocarbon containing no aliphatic unsaturated bonds.

14. The composition of claim 5 where the hydroxyl containing compound comprises a silanol group-containing organosiloxane.

15. The composition of claim 14 where the silanol group-containing compound is represented by the general formula:

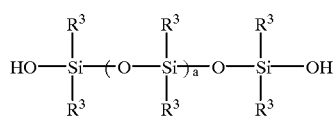

Where $R^3$ is a substituted or unsubstituted monovalent hydrocarbon containing no aliphatic unsaturated bonds.

16. The composition of claim 5 where the hydroxyl containing component comprises water.

17. The composition of claim 5 where the platinum group metal catalyst is selected from compounds of rhodium and platinum.

18. The composition of claim 5 where the wollastonite is added at a level of from 1 to 60 percent by weight.

19. The composition of claim 5 where the wollastonite has a number average particle size of from about 2 to 30 μm and an aspectratio (length-to-diameter)of from about 3:1 to 30:1.

20. The composition of claim 19 where the wollastonite has a number average particle size of from about 5 to 15 μm.

21. The composition of claim 19 where the wollastonite has an aspect ratio of from about 15:1 to 30:1.

22. The composition of claim 6 where the resinous polyorganosiloxane comprises triorganosiloxy and $SiO_{4/2}$ units.

23. The composition of claim 6 comprising no more than 75 percent by weight resinous polyorganosiloxane, based on the total composition.

24. A silicone foam-forming composition comprising:
   ($A^1$) a hydroxylated polyorganosiloxane containing an average of from about 1 to 2.5 silicon-bonded hydroxyl radicals per molecule;
   (B) an organohydrogensiloxane containing at least three silicon-bonded hydrogen atoms per molecule wherein there is no more than one of said hydrogen atoms per silicon atom;
   (D) a platinum catalyst; and
   (E) wollastonite.

25. The composition of claim 24 where the hydroxylated polyorganosiloxane has a viscosity of the polymer has a viscosity at 25° C. of 10 to 500,000 mPa.s.

26. The composition of claim 24 where the hydroxylated polyorganosiloxane has a viscosity of 100 to 250,000 mPa.s.

* * * * *